(12) United States Patent
Hare et al.

(10) Patent No.: US 9,158,410 B2
(45) Date of Patent: Oct. 13, 2015

(54) UTILIZING A TOUCH SCREEN AS A BIOMETRIC DEVICE

(71) Applicant: INTERNATIONAL BUSINESS MACHINES CORPORATION, Armonk, NY (US)

(72) Inventors: David W. Hare, Raleigh, NC (US); Dennis D. Lingerfelt, Anderson, SC (US); Aaron J. Quirk, Cary, NC (US); William D. Whitt, North Augusta, SC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/895,961

(22) Filed: May 16, 2013

(65) Prior Publication Data

US 2014/0341446 A1    Nov. 20, 2014

(51) Int. Cl.
| | | |
|---|---|---|
| *G05B 19/00* | (2006.01) | |
| *G06F 3/041* | (2006.01) | |
| *G06K 9/00* | (2006.01) | |

(52) U.S. Cl.
CPC .......... *G06F 3/0416* (2013.01); *G06K 9/00026* (2013.01); *G06K 9/00899* (2013.01)

(58) Field of Classification Search
CPC ....... G06F 12/32; G06F 3/044; G06F 21/554; G06F 21/88; G06F 3/0416; G06F 3/048; G06K 9/00026; G06K 9/00389; G06K 9/00013; G06K 9/222; G06K 9/627; G06K 9/78; G06K 9/00899

USPC ......... 382/124, 321, 125, 126, 103, 100, 115; 345/173, 174, 175, 156; 726/16, 27, 726/29, 26, 30; 715/863, 769; 340/5.53, 340/5.74, 5.8, 5.81, 5.82, 5.83, 5.52, 5.51, 340/5.2

See application file for complete search history.

(56) References Cited

U.S. PATENT DOCUMENTS

| | | | |
|---|---|---|---|
| 5,420,936 A * | 5/1995 | Fitzpatrick et al. | ........... 382/124 |
| 6,735,307 B1 * | 5/2004 | Volckers | .................. 379/433.07 |
| 6,977,646 B1 * | 12/2005 | Hauck et al. | .................. 345/173 |
| 8,605,960 B2 * | 12/2013 | Orsley | ........................... 382/124 |
| 2004/0239648 A1 | 12/2004 | Abdallah et al. | |
| 2010/0220900 A1 | 9/2010 | Orsley | |
| 2010/0225443 A1 | 9/2010 | Bayram et al. | |
| 2011/0126024 A1 | 5/2011 | Beatson et al. | |

(Continued)

OTHER PUBLICATIONS

"Methods of Using Biometrics to Authenticate Users", IP.com, IPCOM000216429D, Apr. 5, 2012, published on the world wide web at: http://ip.com/IPCOM/000216429.

(Continued)

*Primary Examiner* — Sheela Chawan
(74) *Attorney, Agent, or Firm* — Paul S. Drake (57) ABSTRACT

A method, system or computer usable program product for authenticating a fingerprint by aggregating samples on a digital touch screen including capturing multiple data samples of a finger swipe across the touch screen, wherein the touch screen is used both for fingerprint recognition and manipulation of a user interface; utilizing a processor to aggregate the multiple data samples to form a combined sample fingerprint of the finger; and responsive to detecting the combined sample fingerprint matching a predetermined allowed fingerprint, providing a signal indicating the fingerprint is authentic.

20 Claims, 7 Drawing Sheets

(56) References Cited

U.S. PATENT DOCUMENTS

2013/0117699 A1* 5/2013 Branson et al. ............... 715/769
2013/0332892 A1* 12/2013 Matsuki ........................ 715/863
2013/0333020 A1* 12/2013 Deshpande .................... 726/16

OTHER PUBLICATIONS

"Touch Screen Applications", IP.com, IPCOM000210746D, Sep. 9, 2011, published in the world wide web at: http://ip.com/IPCOM/000210746.

"Authentication method for portable information device with touch panel", IP.com, IPCOM000195599D, May 7, 2010, published on the world wide web at: http://ip.com/IPCOM/000195599.

Chuong Nguyen, "Fingerprint Scanners, NFC, New Lapdocks in the Future for Motorola", www.gottabemobile.com, Apr. 16, 2012, found on the world wide web at: http://www.gottabemobile.com/2012/04/16/fingerprint-scanners-nfc-new-lapdocks-in-the-future-for-motorola/.

"AES850", www.AuthenTec.com, Aug. 4, 2012, found on the world wide web at: http://web.archive.org/web/20120804123749/http://www.authentec.com/a/Production/smartsensors_mobile/AES850.aspx.

* cited by examiner

UTILIZING A TOUCH SCREEN AS A BIOMETRIC DEVICE

BACKGROUND

1. Technical Field

The present invention relates generally to utilizing a touch screen as a biometric device, and in particular, to a computer implemented method for authenticating a fingerprint by aggregating samples with a touch screen.

2. Description of Related Art

Biometrics refers to the field of technology where an individual is identified using biological traits. Biometrics has been utilized to verify or otherwise authenticate the identity of a user for security purposes such as for controlling access to devices or information. Many types of biometrics may be utilized such as facial recognition, voice recognition, retinal and iris recognition, and fingerprints.

The identification of an individual by fingerprints, known as dactyloscopy, dates back as far as the Babylonians, but did not become commonplace until the $20^{th}$ century. The use of digital fingerprints to identify an individual by a computer or other computing device is much more recent, and is a growing field of technology. However, there are many barriers to the acceptability of this technology including speed, accuracy and cost.

SUMMARY

The illustrative embodiments provide a method, system, and computer usable program product for authenticating a fingerprint by aggregating samples on a digital touch screen including capturing multiple data samples of a finger swipe across the touch screen, wherein the touch screen is used both for fingerprint recognition and manipulation of a user interface; utilizing a processor to aggregate the multiple data samples to form a combined sample fingerprint of the finger; and responsive to detecting the combined sample fingerprint matching a predetermined allowed fingerprint, providing a signal indicating the fingerprint is authentic.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Processes and devices may be implemented and utilized to detect biometrics using a touch screen. These processes and apparatuses may be implemented and utilized as will be explained with reference to the various embodiments below.

Figure 1:
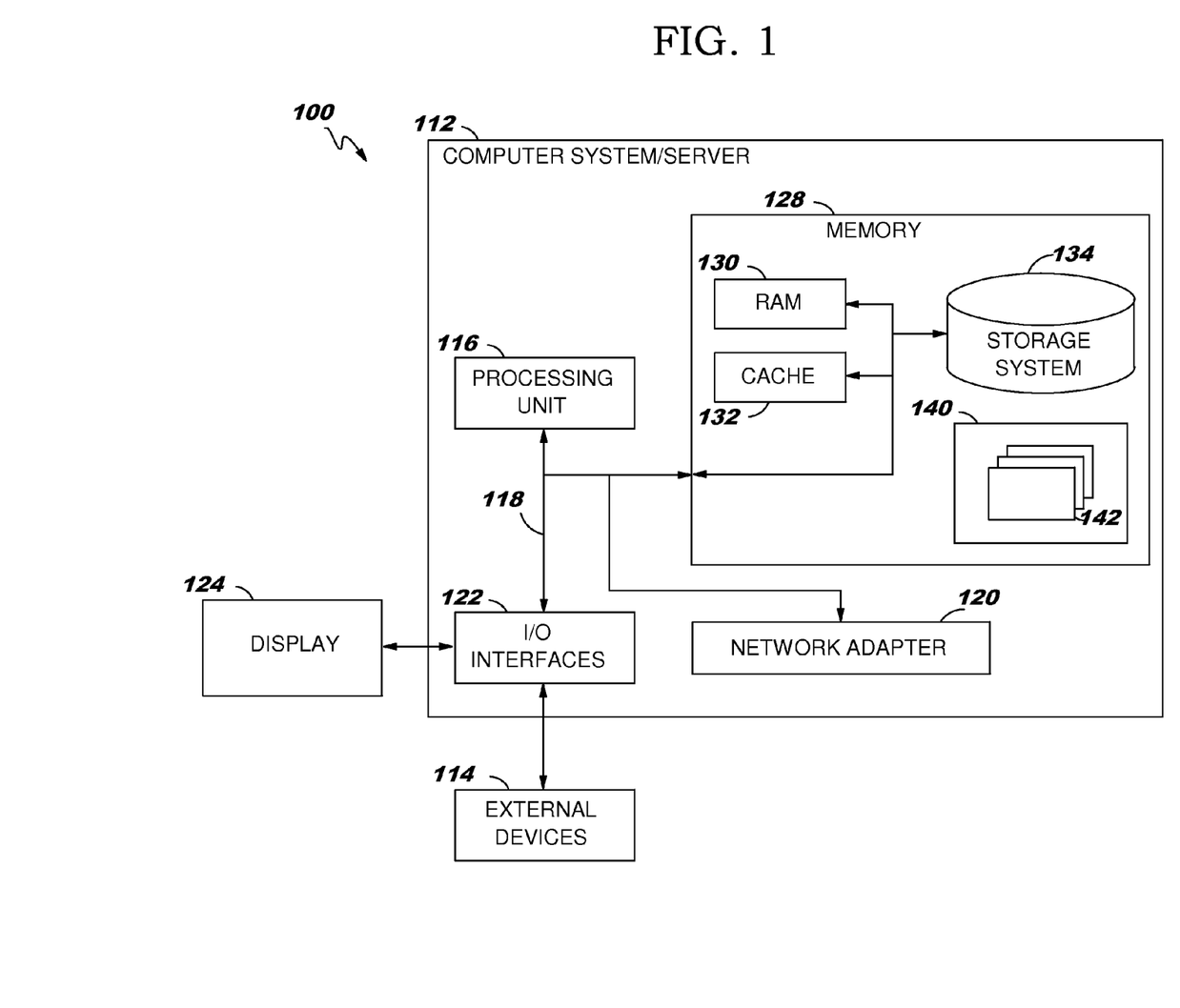
FIG. 1 is a block diagram of a data processing system in which various embodiments may be implemented.

FIG. 1 is a block diagram of a data processing system in which various embodiments may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, which may be intra-chip or inter-chip, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a USB or other interface or other type of architecture for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be in software, firmware or hardware, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for utilizing a touch screen as a biometric device.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
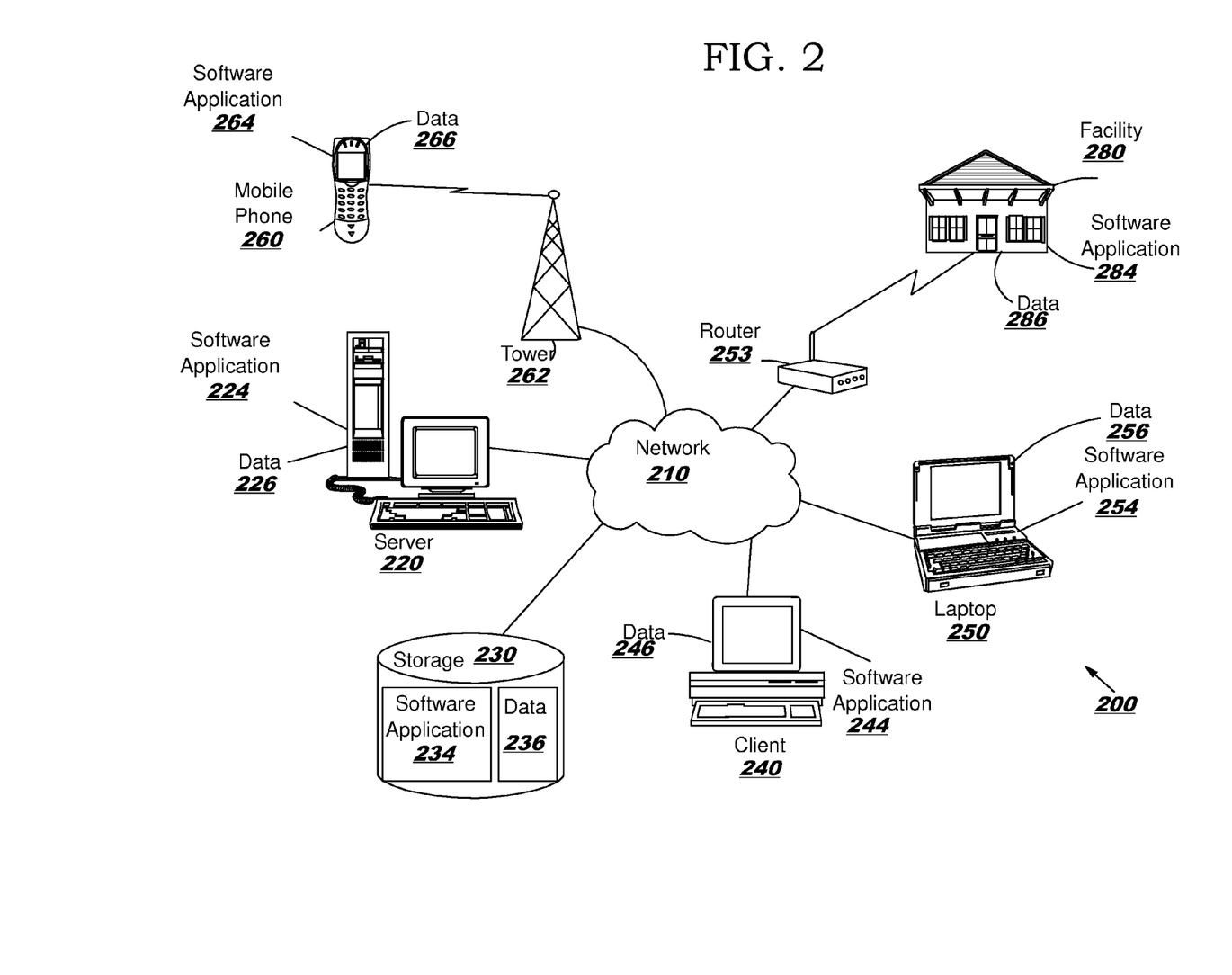
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for utilizing a touch screen as a biometric device or other software applications and data in accordance with embodiments described herein. Storage 230 may contain software application 234 and a content source such as data 236 for utilizing a touch screen as a biometric device. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, general authentication daemon, operating system, or other software application for utilizing a touch screen as a biometric device.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3A:
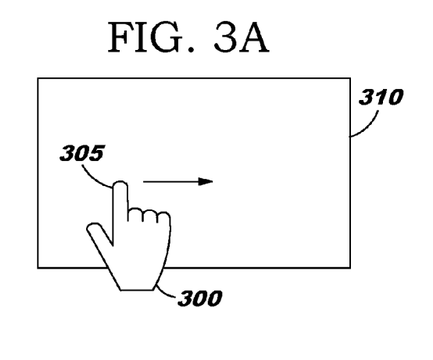
FIGS. 3A and 3B are diagrams of a user swiping a fingerprint across a touch sensitive display in which various embodiments may be implemented.
Figure 3B:
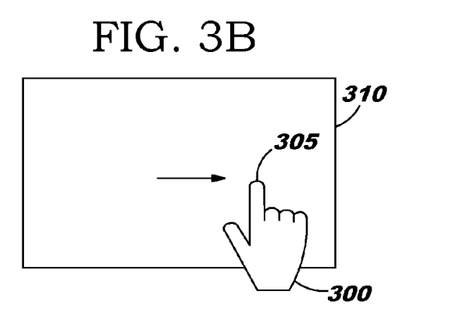

FIGS. 3A and 3B are diagrams of a user swiping a fingerprint across a touch sensitive display in which various embodiments may be implemented. A user uses his or her hand 300 to swipe an index fingertip 305 horizontally across a touch sensitive display 310 from left to right. The touch sensitive display may also be referred to herein as a touch screen or digital touch screen. Display 310 then utilizes an array of sensors (i.e. a sensor grid) embedded in the display to detect the fingerprint of the user based on this act of swiping as explained further below. Display 310 may be a touch sensitive display of a laptop, tablet, smartphone, or other device including a standalone touch sensitive display coupled to a processing unit. The touch sensitive display may be a self-capacitive or other type of touch sensitive display with an array of sensors for detecting the location of a touch across multiple sensors. The touch sensitive display may generate a set of values relating to the amount of skin in direct contact with the display such as a set of values of detected capacitance by the sensor grid. Display 310 is shown in a landscape mode, but may be positioned in a portrait mode. The fingertip swipe is shown to be horizontal from left to right, but may be vertical, at an angle, or from right to left depending on the configuration of the system. The right hand fingertip is used in this example, but alternative fingertips may be used of either hand as well as other portions of the fingers or hands.

Figure 3C:
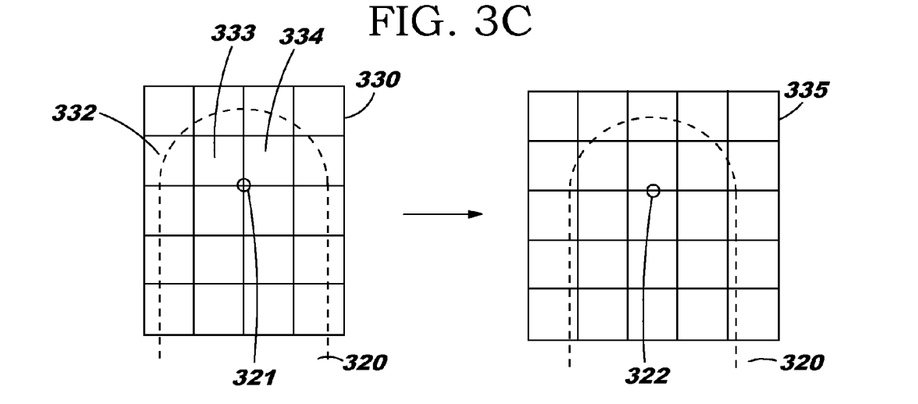
FIG. 3C is a diagram of a fingerprint being detected by an array of sensors embedded in a touch sensitive display in which various embodiments may be implemented.

FIG. 3C is a diagram of a fingerprint being detected by an array of sensors embedded in a touch sensitive display in which various embodiments may be implemented. The touch sensitive display may be a capacitive or other type of touch sensitive display with an array of sensor for detecting the location of a touch. In the first part of FIG. 3C, fingerprint 320 touches a five by four (rows and columns) set of sensors 330 at time T1. The center of fingerprint 320 is centroid 321. Each of the sensors detecting fingerprint 320 includes a value relating to the amount of capacitance detected. For example, sensor 332 may detect about half of the capacitance of sensor 333. However, sensor 333 may detect more or less capacitance than sensor 334 because of the number of ridges or valleys or the width thereof that are in contact or not with each sensor. Also in FIG. 3C, fingerprint 320 touches a five by five set of sensors 335 at time T2. The center of fingerprint 320 at time T2 is centroid 322. Each of the sensors detecting fingerprint 320 includes a value relating to the amount of capacitance detected.

Figure 3D:
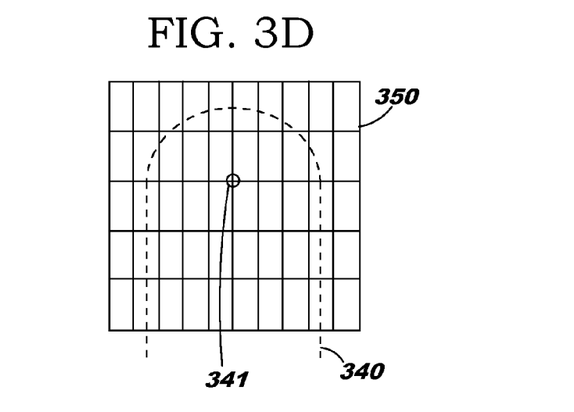
FIG. 3D is a diagram of a combination of the sensor readings of FIG. 3C at times T1 and T2 in which various embodiments may be implemented.

FIG. 3D is a diagram of a combination of the sensor readings of FIG. 3C at times T1 and T2 in which various embodiments may be implemented. The overlap of the two illustrations is based on centroid 341 of fingerprint 340, which was derived from centroids 321 and 322 of fingerprint 320. The values of sensors 330 and 335 may be combined into the various values of 350 by addition, subtraction, or other more complex statistical operations as more samples are combined. With a sufficient number of appropriate samples, the fingerprint of the user can be resolved as described below. The number of actual sensors utilized may be more or less than shown in FIGS. 3C and 3D. As the user swipes a fingertip across a touch sensitive display, hundreds of samples may be taken during the swipe process and compared or otherwise statistically processed as described below for the purpose of determining the user's fingerprint with the touch display.

Where one or more horizontal swipes are effective for resolving the vertical ridges of a fingerprint, it is much less effective for resolving the horizontal ridges of a fingerprint. As a result, one or more vertical swipes may also be utilized for fully resolving the fingerprints of a fingertip. Alternatively, angular swipes not horizontal or vertical may also be utilized so long as there is sufficient scan in both dimensions to fully document the geometry of the fingerprint.

Figure 4:
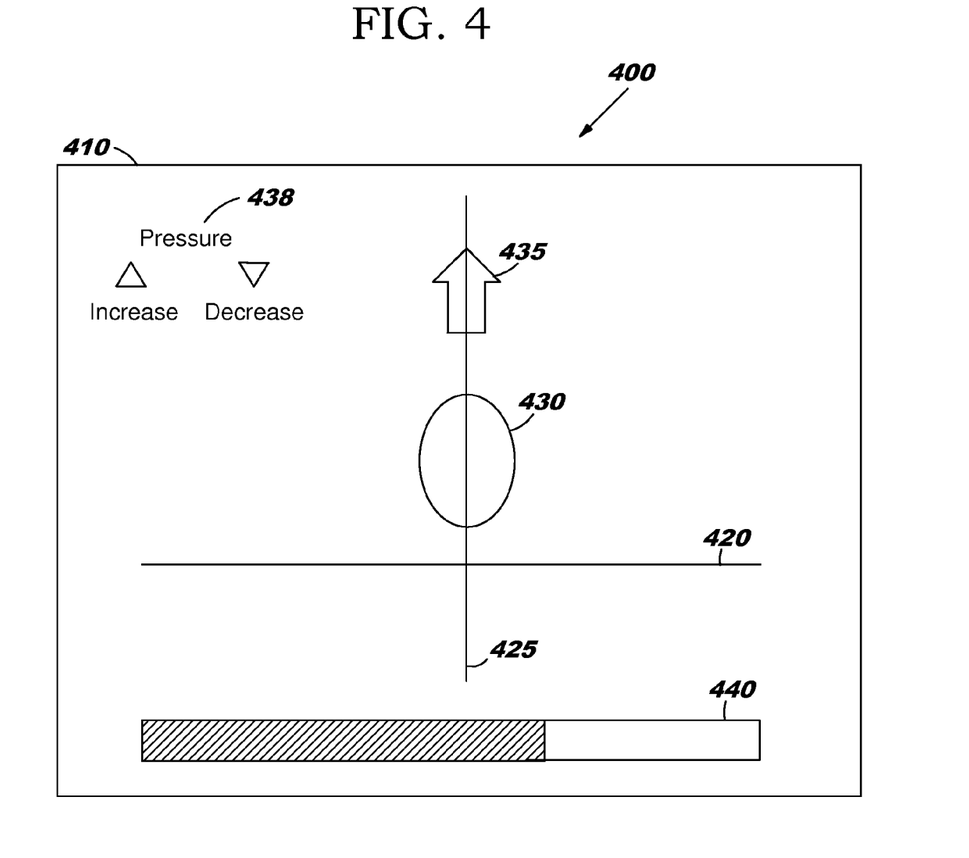
FIG. 4 is a diagram of a user interface for instructing a user to swipe their fingerprint in which various embodiments may be implemented.

FIG. 4 is a diagram of a user interface 400 for instructing a user to swipe their fingertip in which various embodiments may be implemented. A touch sensitive display 410 shows a horizontal swipe line 420 and a vertical swipe line 425. The user is expected to place his or her fingertip on a moving region 430 and proceed in direction of arrow 435 at a constant velocity. The velocity or speed of the swipe should match the speed of region 430 along either the horizontal or vertical swipe lines. The pressure of the swipe should be increased or decreased in accordance with the pressure indicators 438. The user may be instructed to swipe his or her fingerprint several times in either the horizontal or vertical direction. This allows sufficient samples to statistically determine the fingerprint of the user's fingertip. A percentage of completion of the swiping process may be shown in bar 440, thereby providing feedback to the user of the continued success of the swiping process. The percentage of completion may be based on a measure of dispersion such as a confidence interval for the results of the fingerprint samples.

Three different coordinate systems can be utilized with various embodiments. A first coordinate system is a device resolution absolute coordinate system. That is, the array of sensors utilized in the touch screen for sensing the touch of a user. If the touch screen has an array with 450 rows of sensors and 800 columns on sensors, then there would be a total of 34000 sensors in an X-Y coordinate system with the bottom left sensor set as (0,0) and the upper right sensor set as (450,800). Alternative embodiments may utilize the upper right sensor as the (0,0) sensor as well as other configurations.

A second coordinate system is a device resolution local coordinate system. This coordinate system has the same resolution as the device absolute local coordinate system, but with the centroid of the detected fingerprint set as (0,0). For example, if the centroid is located at (200, 300) of the device absolute coordinate system, then point (400, 425) of the device absolute coordinate system would be point (200, 125) of the device resolution local coordinate system. For ease of reference, the first coordinate system can be referred to with points (X1, Y1) and the second coordinate system can be referred to with points (X2, Y2).

A third coordinate system is the interpolated high resolution coordinate system. This is a much higher resolution coordinate system and is utilized for identifying the ridges and valleys of the user's fingerprints. As a result, this coordinate system needs to be at a resolution sufficient to perform that identification. The centroid of a fingerprint is set to (0,0) in the third coordinate system. For ease of reference, a point in the third coordinate system can be referred to as (X3, Y3). The resolution difference between the third and the other coordinate systems is represented as $\alpha$. For example, if $\alpha$=square root of 2, then the third coordinate system will have twice the resolution of the first and second coordinate systems (i.e. square root of 2 increase in resolution in the x direction and square root of 2 increase of resolution in the y direction). If $\alpha$=2, the overall resolution would increase by a factor of 4 since the $\alpha$ value is applied in each direction. Both the second and third coordinate systems would have a common (0,0) center point with the second coordinate system. The sample data may be converted directly from the first coordinate system to the third coordinate system in a single step, thereby speeding up the conversion process.

Some of the mathematics which can be utilized with these coordinate systems is as follows. Let $C_a$ represent the rectangular region bounding the area of non-nominal (e.g. non-zero) capacitance stored in a T×U matrix at time a. For example, FIG. 3C illustrates a 5×4 matrix at time T1 and a 5×5 matrix at time T2. Let $cent_a$ represent the centroid location of $C_a$ in the device absolute coordinate system. Let $C_{a-1}$ represent the rectangular region bounding the area of non-nominal (e.g. non-zero) capacitance stored at time a−1 with centroid $cent_{a-1}$, also in the device absolute coordinate system. Let $D_a$ represent the vector difference between $cent_a$ and $cent_{a-1}$.

A function, T, converts from $C_a$ to $C_{fa}$:

$$T(C_n)_{x,y} = \begin{cases} a(x), a'(y) \geq 0 \wedge a(x) < t \wedge a'(y) < u : C_{n_{a(x)a'(y)}} \\ a(x), a'(y) < 0 \vee a(x) \geq t \vee a'(y) \geq u : 0 \end{cases}$$

where $$a(x) = \left\lfloor \frac{x - (D_x - L_x)}{\alpha} \right\rfloor$$

$$a'(y) = \left\lfloor \frac{y - (D_y - L_y)}{\alpha} \right\rfloor$$

This provides for a direct conversion from a device resolution absolute coordinate system to a high resolution coordinate system prior to interpolation.

To generate a mean one sample at a time from converted and interpolated samples, let $C_{fa}$ be a high resolution matrix of size $\alpha*T \times \alpha*U$ with $C_{f0}$ having an initial value:

$$C_{fa} = \frac{\frac{(n-1)\sum_{i=1}^{n-1} C_{fi}}{(n-1)} + C_{fa}}{n}$$

which reduces further to:

$$C_{fa} = \left[ \sum_{i=1}^{n-1} C_{fi} + C_{fa} \right] \div n$$

and finally to:

$$C_{fa} = \frac{(n-1)C_{fa-1} + C_{fa}}{n}$$

As each step of calculating the mean C bar, the underlying geometry gains additional resolution, and at each step, the weight of the new sample has a lower impact than the accumulated data, creating a realistic model of capacitance on a higher density sensor grid using a lower density grid that has a much lower cost.

Figure 5:
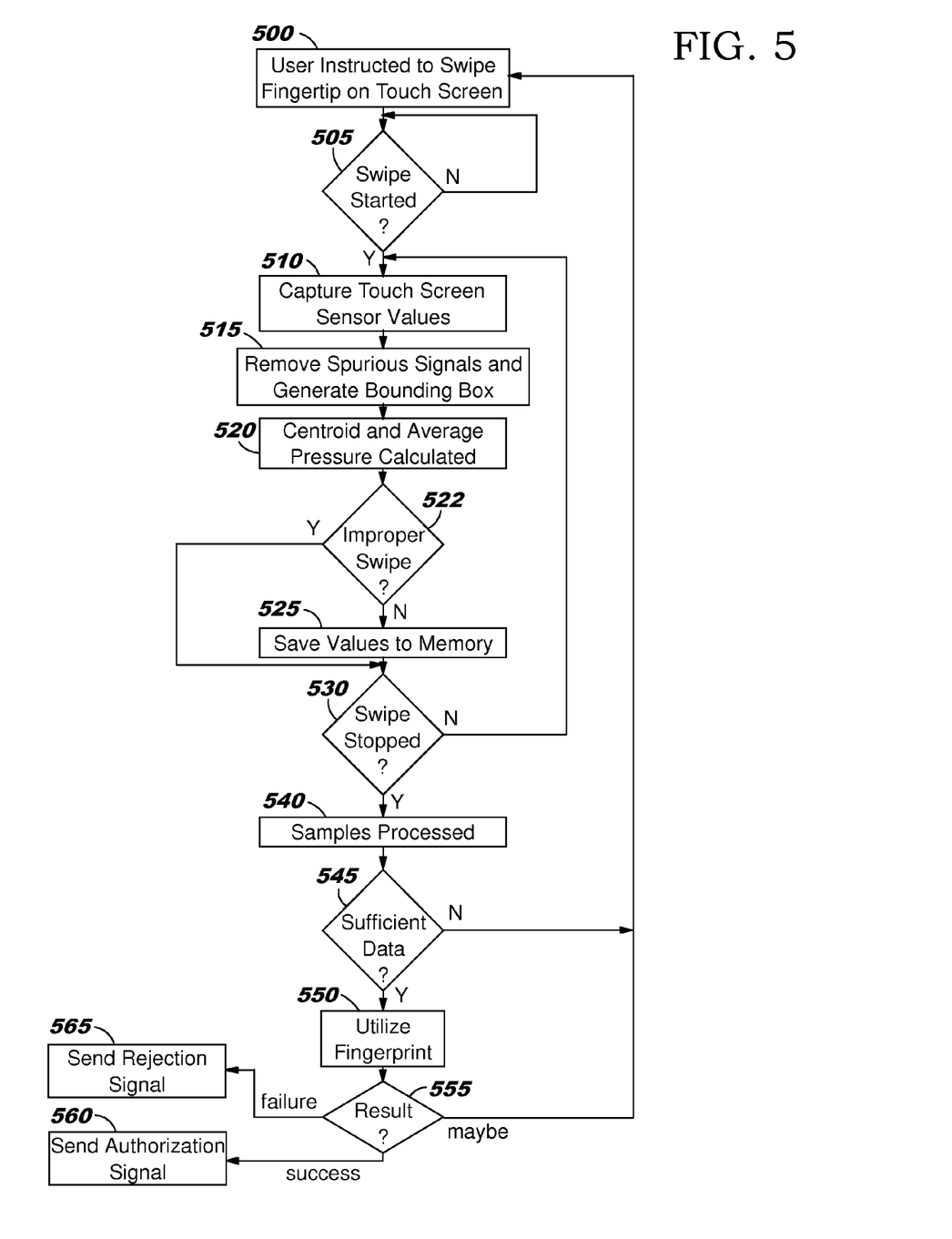
FIG. 5 is a flow diagram of the process for determining the fingerprints of a user in accordance with a first embodiment.

FIG. 5 is a flow diagram of the process for determining the fingerprints of a user in accordance with a first embodiment. This process can be implemented locally such as on a laptop or smartphone, or in a client server environment such as where a client system with a touch sensitive display communicates with a server for processing the results. A secure website across the internet may require fingerprint authorization to allow user access by requiring the user to swipe his or her finger across a local touch sensitive display for processing locally or by the website server.

In a first step 500, the user is instructed to swipe his or her fingertip across the touch screen. This instruction may be provided using the user interface illustrated in FIG. 4 above. In a second step 505, the system determines whether the user has initiated the swipe. If yes, then processing continues to step 510, otherwise processing returns to step 505. This can be detected by polling the touch screen sensors or utilizing an operating system callback to determine whether the user has touched the screen and has started moving the point of touch in the direction desired.

In step 510, a sample of the values of the non-nominal sensors is captured with a time stamp. This sample can be performed about 100 times a second, although fewer or more samples may be obtained so long as it is within the performance characteristics of the display. In step 515, any sample values not contiguous to the majority of sample values are then removed or otherwise deleted as spurious signals in an initial filter or filtration step. The remaining sample values may be isolated and captured as a bounding box or matrix containing all the contiguous non-nominal values. The size of a sample bounding box may vary from sample to sample within a certain expected range. For example, the set of pixels represented by the bounding box should not be much larger than the size of a fingerprint. However, some perimeter non-nominal pixels may be excluded so long as it is balanced (not more on one side or the other) to keep from affecting the centroid to be calculated below. A check may also be performed to verify that the sample is close in location on the display to the previous sample, indicating a correct sample. The shape of the bounding box may also indicate if the user is tilting the finger improperly during the swipe.

Then in step 520, the centroid of the remaining captured sample values is calculated using a weighted average. That is, if the values to the right of the median center point have a heavier weight than the values to the left of the median center point, then the user's fingertip is more to right of the median center point and the centroid should reflect that. Concurrently, an average fingerprint pressure is also calculated. This average pressure can be determined by various techniques including the size of the fingerprint sample relative to other fingerprint samples. Alternatively, for a capacitive touch screen, the total capacitance over the captured sample area (i.e. the bounding box) may be compared to an expected range to determine whether too much or too little pressure was applied.

Subsequently in step 522, it is determined whether the latest finger swipe sample was too heavy, too light, tilted, too slow, too fast or otherwise improper creating an unacceptable sample. For example, the bounding box size may indicate the pressure was too heavy or too soft, the bounding box shape may indicate that the finger was improperly tilted during the swipe, the distance between samples may indicate that the velocity of the finger swipe was too fast or too slow, etc. The pressure, tilt or velocity can be determined by various techniques including the size, the shape, or the location of the fingerprint sample relative to other fingerprint samples. Alternatively, for a capacitive touch screen, the total capacitance over the captured sample area (i.e. the bounding box) may be compared to an expected range to determine whether too much or too little pressure was applied. If yes, then processing proceeds to step 530 to continue taking swipe samples (with an indicator of more or less pressure or other instructions such as described above with reference to FIG. 4), otherwise processing continues to step 525.

Then in step 525, the remaining non-nominal values, the time stamp, and the tentative centroid are saved to memory for processing as described below. Each time stamped sample is a matrix $C_a$ at time a with centroid cent, from 1 to n where n is the number of samples taken during the swipe. By storing the unprocessed data, generally more samples can be taken more quickly without running into processing limitations. However, alternative embodiments may process each sample of data as described below before taking the next sample of the current finger swipe. Subsequently in step 530, it is determined whether the user has stopped the finger swipe. If yes, then processing proceeds to step 540, otherwise processing returns to step 510 for another sample of the touch screen sensors. This can be detected by determining whether any of the touch screen sensors is detecting a touch or whether the past two or more samples have essentially the same value, indicating the user has stopped moving his or her fingertip across the screen. The number of samples should correspond to the speed of the user's finger across the screen and the resolution of the third coordinate system in the direction of the finger swipe (e.g. square root of α)

In step 540, the time stamped samples are then processed in accordance with the formulas described above and as further described in FIG. 6 below to generate a resolved fingerprint. In step 545, it is determined whether sufficient data has been captured to resolve the fingerprint of the user. For example, there may be a minimum number of swipes before determining that there may be sufficient data to do a comparison of the resolved fingerprint to a set of fingerprints (one or more) to determine whether the resolved fingerprint is an authorized fingerprint. Alternatively, a measure of dispersion such as a confidence interval with a desired range or a desired standard deviation may be utilized to determine whether sufficient number of samples has been collected. If there is not sufficient data, then processing returns to step 500, otherwise, processing continues to step 550.

In step 550, the resolved digital fingerprint is then utilized as desired such as for security purposes. For example and as described with reference to this figure, the resolved digital fingerprint may be compared to a stored set of fingerprints (stored locally or remotely across a network) to determine whether the fingerprints are the same or different. This can result in one of several actions in step 555. If the resolved fingerprint is similar enough to one of the stored fingerprints (success), then an authorization signal may be provided in step 560. This signal may be a software instruction or an electronic signal which may be utilized by an operating system or application to notify the user and authorize the desired activity by the user. If the resolved fingerprint is sufficiently dissimilar from any of the stored set of fingerprints (failure), then a rejection signal may be provided in step 565. This signal may be a software instruction or an electronic signal which may be utilized by an operating system or application to notify the user and prevent the desired activity by the user. A failure signal may also be sent after a certain number of swipes if success has not been achieved yet. Alternatively, if the resolved fingerprint is similar to one or more of the stored set of fingerprints but not sufficiently similar for success (maybe), then further swipes would be requested to make a solid determination of success or failure with processing returning to step 500.

Figure 6:
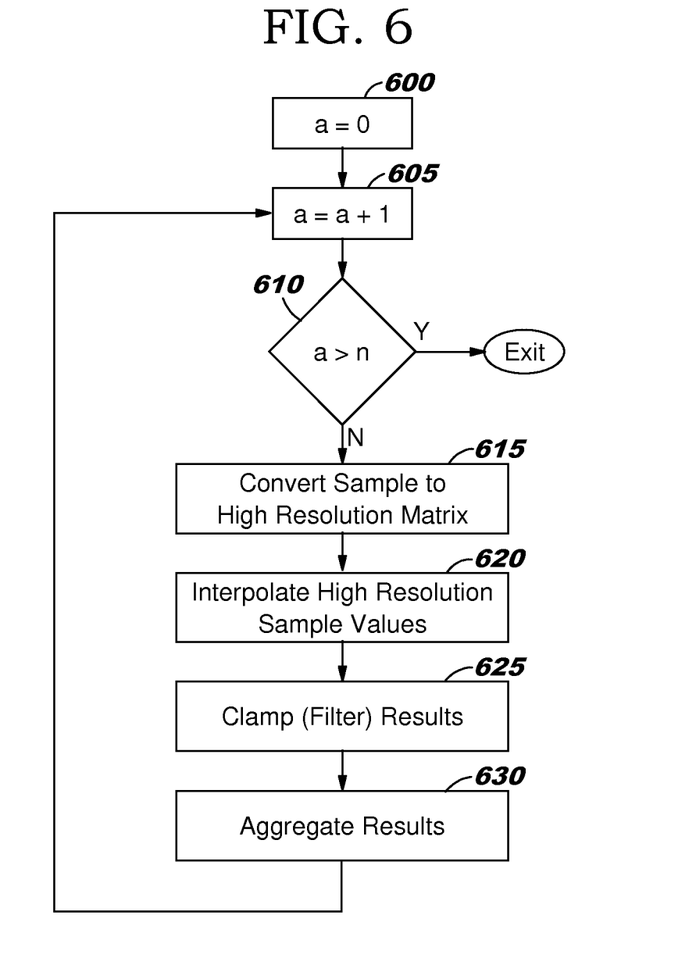
FIG. 6 is a flow diagram of a process for converting, interpolating and aggregating fingerprint sample data in which various embodiments may be implemented.

FIG. 6 is a flow diagram of a process for converting, interpolating and aggregating fingerprint sample data in which various embodiments may be implemented. Each time stamped sample is a matrix $C_a$ at time a with centroid cent, from 1 to n where n is the number of samples taken during the swipe. In a first step 600, a is set to 0. In step 605, a is then incremented by 1. In step 610, it is determined whether a is greater than n. If yes, then the sampled swipe has been converted, interpolated and aggregated, so processing ceases (i.e. returns to FIG. 5 or 7 for possibly another fingertip swipe to be processed). If not, then processing continues to step 615.

In step 615, sample $C_a$ is then converted from a device resolution absolute coordinate system to a high resolution local coordinate system as sample $C_{fa}$ utilizing the formulas described above. This can include calculating a vector difference between $cent_a$ and $cent_{a-1}$. The sample values are unchanged and each value may be allocated to multiple entries of the high resolution matrix. For example, where α is equal to 2, then four entries may have the same value as the underlying device resolution entry. In this embodiment, interpolations are performed after the conversion, although they could be performed during the conversion process. Another step of filtering could be performed at this step where the focus is on the more inner pixels of each sample rather. This is because the outer or perimeter samples may be less precise due to less finger pressure causing fewer samples of the outer pixels.

In step 620, sample $C_{fa}$ is then interpolated to $C_{ia}$ where the sample values in the high resolution matrix are adjusted based on surrounding values, thereby providing a more accurate estimation of the underlying sampled fingerprint. Various types of interpolation may be utilized in order to better estimate the fingerprint being sampled such as a linear interpolation, quadratic interpolation, etc. This interpolation may also include other factors such as average pressure or sample size to better interpolate and normalize the results compared to other samples. It is generally preferable that the method of interpolation utilized here matches the type of interpolation utilized to generate any fingerprint to be compared to this sampled fingerprint. Otherwise, the chance of a successful match with the same fingerprint may be significantly reduced. As mentioned above, the step of interpolation may be performed during the conversion process.

Next, in step 625, the resulting interpolated sample matrix $C_{ia}$ may be clamped generating matrix $C_{ca}$. That is, the outer pixels or sample values may be ignored or just removed. This allows this process to focus on the central elements of the fingerprint and to disregard the outer elements or pixels where there may be a greater margin of error due to slight fingertip tilting, some lack of fingerprint pressure in some samples, or just interpolation variation caused by the lack of adjoining samples on all sides. This step of clamping is performed on the interpolated data rather than the raw data as the raw data may be useful in the interpolation process.

Finally, in step 630 clamped sample $C_{ca}$ is then aggregated with prior samples. This may be performed utilizing the formulas described above where a running average is generated for each matrix element. Alternative aggregation techniques can be utilized including regression analysis. Also, multiple aggregations may be generated. For example, there may be one aggregation for swipes running left to right (or up to down) and a separate aggregation for swipes running right to left (or down to up). This is because the fingertip deforms slightly depending of the direction of the swipe. As a result, a combination of left to right and right to left samples may provide somewhat of a stereoscopic view of the fingerprint. The separate aggregations may be combined once the swipe is completed or all swipes are completed, or they may be retained separately if the stored fingerprint used for comparison is also retained in multiple aggregates.

Once the aggregation is complete, then processing returns to step 605 for processing the next sample. This continues until all samples of the current set of samples for a fingertip swipe have been processed.

Figure 7:
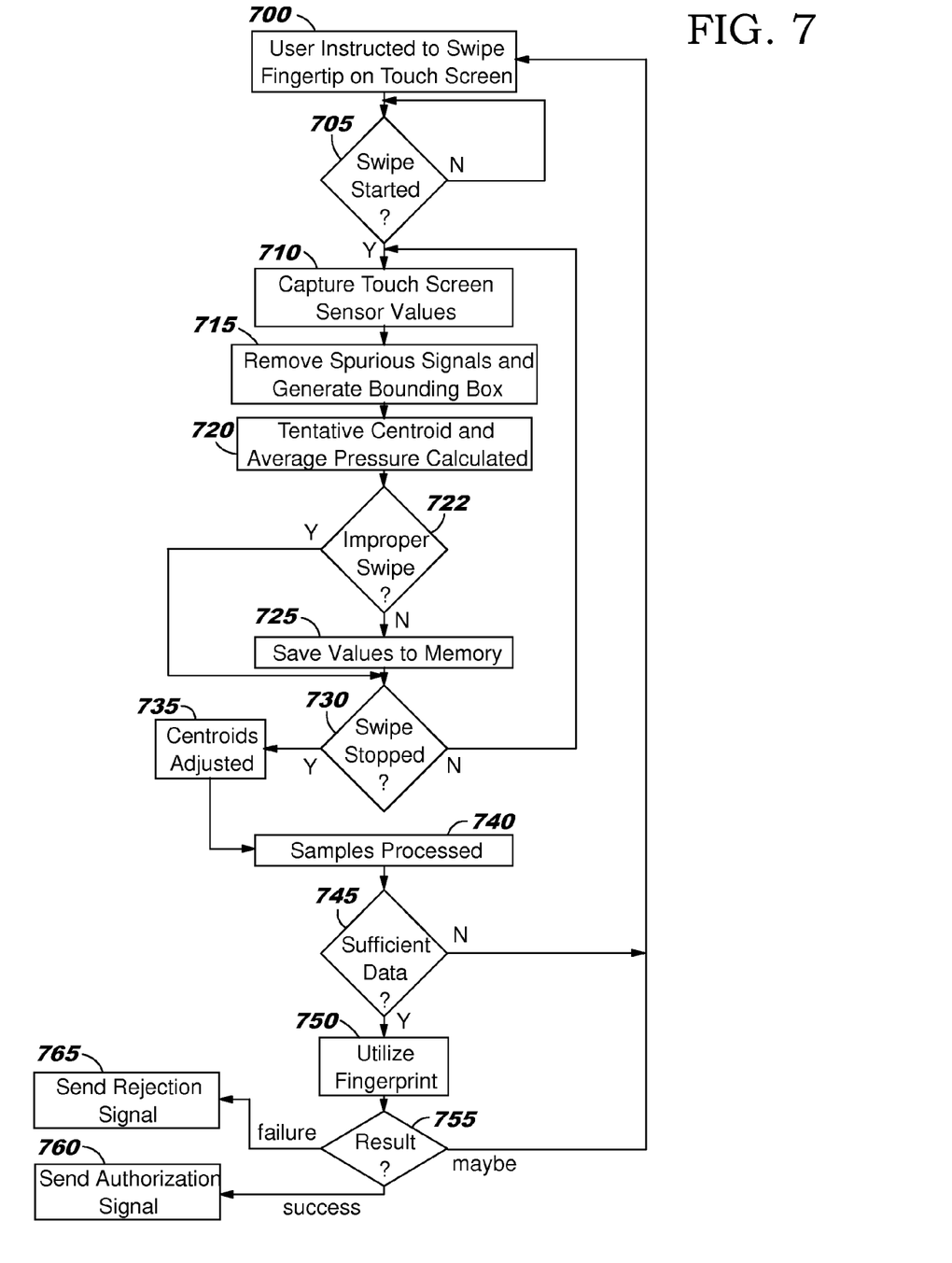
FIG. 7 is a flow diagram the process for determining the fingerprints of a user in accordance with a second embodiment.

FIG. 7 is a flow diagram the process for determining the fingerprints of a user in accordance with a second embodiment. This process can be implemented locally such as on a laptop or smartphone, or in a client server environment such as where a client system with a touch sensitive display communicates with a server for processing the results. A secure website across the internet may require fingerprint authorization to allow user access by requiring the user to swipe his or her finger across a local touch sensitive display for processing locally or by the website server.

In a first step 700, the user is instructed to swipe his or her fingertip across the touch screen. This instruction may be provided using the user interface illustrated in FIG. 4 above. In a second step 705, the system determines whether the user has initiated the swipe. If yes, then processing continues to step 710, otherwise processing returns to step 705. This can be detected by polling the touch screen sensors to determine whether the user has touched the screen and has started moving the point of touch in the direction desired.

In step 710, a sample of the values of the non-nominal sensors is captured with a time stamp. This sample can be performed about 100 times a second, although fewer or more samples may be obtained so long as it is within the performance characteristics of the display. In step 715, any sample values not contiguous to the majority of sample values are then removed or otherwise deleted as spurious signals in an initial filter or filtration step. The remaining sample values may be isolated and captured as a bounding box or matrix containing all the contiguous non-nominal values. The size of a sample bounding box may vary from sample to sample within a certain expected range. For example, the set of pixels represented by the bounding box should not be much larger than the size of a fingerprint. However, some perimeter non-nominal pixels may be excluded so long as it is balanced (not more on one side or the other) to keep from affecting the centroid to be calculated below. A check may also be performed to verify that the sample is close in location on the display to the previous sample, indicating a correct sample. The shape of the bounding box may also indicate if the user is tilting the finger improperly during the swipe.

Then in step 720, a tentative centroid of the remaining captured sample values is calculated using a weighted average. That is, if the values to the right of the median center point have a heavier weight than the values to the left of the median center point, then the user's fingertip is more to right of the median center point and the centroid should reflect that. Concurrently, an average fingerprint pressure is also calculated. This average pressure can be determined by various techniques including the size of the fingerprint sample relative to other fingerprint samples. Alternatively, for a capacitive touch screen, the total capacitance over the captured sample area (i.e. the bounding box) may be compared to an expected range to determine whether too much or too little pressure was applied.

Subsequently in step 722, it is determined whether the latest finger swipe sample was too heavy, too light, tilted too slow, too fast or otherwise improper creating an unacceptable sample. For example, the bounding box size may indicate the pressure was too heavy or too soft, the bounding box shape may indicate that the finger was improperly tilted during the swipe, the distance between samples may indicate that the velocity of the finger swipe was too fast or too slow, etc. The pressure, tilt or velocity can be determined by various techniques including the size, the shape, or the location of the fingerprint sample relative to other fingerprint samples. Alternatively, for a capacitive touch screen, the total capacitance over the captured sample area (i.e. the bounding box) may be compared to an expected range to determine whether too much or too little pressure was applied. If yes, then processing proceeds to step 730 to continue taking swipe samples (with an indicator of more or less pressure or other instructions such as described above with reference to FIG. 4), otherwise processing continues to step 725.

Then in step 725, the remaining non-nominal values, the time stamp, and the tentative centroid are saved to memory for processing as described below. Each time stamped sample is a matrix $C_a$ at time a with centroid $cent_a$ from 1 to n where n is the number of samples taken during the swipe. Subsequently in step 730, it is determined whether the user has stopped the swipe. If yes, then processing proceeds to step 735, otherwise processing returns to step 710 for another sample of the touch screen sensors. This can be detected by determining whether any of the touch screen sensors is detecting a touch or whether the past two or more samples have essentially the same value, indicating the user has stopped moving his or her fingertip across the screen. The number of samples should correspond to the speed of the user's finger across the screen and the resolution of the third coordinate system in the direction of the finger swipe (e.g. square root of a).

In step 735, the tentative centroids are adjusted. This is performed to obtain the most precise centroids possible given the information available. In this embodiment, the samples with the most balanced weighting (where the median and the weighted average are nearly equal) are identified. These balanced samples indicate where the finger is precisely balanced across a set of sensors. These balanced samples are then used to interpolate the other centroids. That is, the time stamps of the balanced centroids are used to interpolate the centroids of the other samples. This interpolation process will help linearize the data. Alternatively, the interpolated results may be weighted with the tentative centroids for each sample. In another alternative, indications of slight tilting of the fingerprint may be utilized to adjust the centroid to better locate the centroid near the same location of the fingertip being sampled for each sample. Other types of adjustments may be utilized based on detected variations in sampling.

In step 740, the time stamped samples are then processed in accordance with the formulas described above and as further described in FIG. 6 above to generate a resolved fingerprint using the newly calculated centroids of step 735. In step 745, it is determined whether sufficient data has been captured to resolve the fingerprint of the user. For example, there may be a minimum number of swipes before determining that there may be sufficient data to do a comparison of the resolved fingerprint to a set of fingerprints (one or more) to determine whether the resolved fingerprint is an authorized fingerprint. Alternatively, a measure of dispersion such as a confidence interval with a desired range or a desired standard deviation may be utilized to determine whether sufficient number of samples has been collected. If there is not sufficient data, then processing returns to step 700, otherwise, processing continues to step 750.

In step 750, the resolved digital fingerprint is then utilized as desired such as for security purposes. For example, the resolved digital fingerprint may be compared to a stored fingerprint (stored locally or remotely across a network) to determine whether the fingerprints are the same or different. This can result in one of several actions in step 755. If the resolved fingerprint is similar enough to one of the stored fingerprints (success), then an authorization signal may be provided in step 760. This signal may be a software instruction or an electronic signal which may be utilized by an operating system or application to notify the user and authorize the desired activity by the user. If the resolved fingerprint is sufficiently dissimilar from any of the stored set of fingerprints (failure), then a rejection signal may be provided in step 765. This signal may be a software instruction or an electronic signal which may be utilized by an operating system or application to notify the user and prevent the desired activity by the user. A failure signal may also be sent after a certain number of swipes if success has not been achieved yet. Alternatively, if the resolved fingerprint is similar to one or more of the stored set of fingerprints but not sufficiently similar for success (maybe), then further swipes would be requested to make a solid determination of success or failure with processing returning to step 700.

The invention can take the form of an entirely software embodiment, or an embodiment containing both hardware and software elements. In a preferred embodiment, the embodiments are implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for utilizing a touch screen as a biometric device. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of authenticating a fingerprint by aggregating samples on a digital touch screen comprising:
   capturing multiple data samples of a finger swipe across the touch screen, wherein the touch screen is used both for fingerprint recognition and manipulation of a user interface;
   utilizing a processor to aggregate the multiple data samples to form a combined sample fingerprint of the finger; and
   responsive to detecting the combined sample fingerprint matching a predetermined allowed fingerprint, providing a signal indicating the fingerprint is authentic;
   wherein at least one of the multiple data samples is not aggregated based on a detected improper finger wipe.

2. The method of claim 1 wherein the touch screen contains capacitive sensors.

3. The method of claim 1 further comprising:
   providing a user interface (UI) to guide a movement of the finger swipe on the touch screen; and
   providing feedback to the user as to progress of authentication.

4. The method of claim 3 wherein guiding movement of the finger swipe is selected from the group of guiding movement at a desired velocity, at a constant velocity, in a desired direction, or with a desired pressure.

5. The method of claim 4 wherein aggregating the multiple data samples includes interpolating the multiple data samples using a coordinate system that has a higher resolution than each of the multiple data samples; wherein the detected improper finger swipe is detected from the group of at an improper velocity, at a variable velocity, in an improper direction, or with an improper pressure; and further comprising responsive to detecting the combined sample fingerprint not matching a predetermined allowed fingerprint, providing a signal indicating the fingerprint is not authentic; wherein at least one of the multiple data samples is not aggregated based on a detected improper finger swipe; wherein the detected improper finger swipe is detected from the group of at an improper velocity, at a variable velocity, in an improper direction, or with an improper pressure; wherein the combined sample fingerprint includes multiple samples based on finger swipe direction; and wherein the touch screen contains capacitive sensors.

6. The method of claim 1 wherein aggregating the multiple data samples includes interpolating the multiple data samples using a coordinate system that has a higher resolution than each of the multiple data samples.

7. The method of claim 1 wherein the detected improper finger swipe is detected from the group of at an improper velocity, at a variable velocity, in an improper direction, or with an improper pressure.

8. The method of claim 1 further comprising responsive to detecting the combined sample fingerprint not matching a predetermined allowed fingerprint, providing a signal indicating the fingerprint is not authentic.

9. The method of claim 1 wherein the combined sample fingerprint includes multiple samples based on finger swipe direction.

10. A computer usable program product comprising a non-transitory computer usable storage medium including computer usable code for use in authenticating a fingerprint by aggregating samples on a digital touch screen, the computer usable program product comprising code for performing the steps of:
    capturing multiple data samples of a finger swipe across the touch screen, wherein the touch screen is used both for fingerprint recognition and manipulation of a user interface;
    utilizing a processor to aggregate the multiple data samples to form a combined sample fingerprint of the finger; and
    responsive to detecting the combined sample fingerprint matching a predetermined allowed fingerprint, providing a signal indicating the fingerprint is authentic;
    wherein at least one of the multiple data samples is not aggregated based on a detected improper finger wipe.

11. The method of claim 10 further comprising:
    providing a user interface (UI) to guide a movement of the finger on the touch screen; and
    providing feedback to the user as to progress of authentication.

12. The computer usable program product of claim 11 wherein guiding movement of the finger swipe is selected from the group of guiding movement at a desired velocity, at a constant velocity, in a desired direction, or with a desired pressure.

13. The computer usable program product of claim 11 wherein the detected improper finger swipe is detected from the group of at an improper velocity, at a variable velocity, in an improper direction, or with an improper pressure.

14. The computer usable program product of claim 11 further comprising responsive to detecting the combined sample fingerprint not matching a predetermined allowed fingerprint, providing a signal indicating the fingerprint is not authentic.

15. The computer usable program product of claim 11 wherein the combined sample fingerprint includes multiple samples based on finger swipe direction.

16. A data processing system for authenticating a fingerprint by aggregating samples on a digital touch screen, the data processing system comprising:
    a processor; and
    a memory storing program instructions which when executed by the processor execute the steps of:
    capturing multiple data samples of a finger swipe across the touch screen, wherein the touch screen is used both for fingerprint recognition and manipulation of a user interface;
    filtering the multiple data samples;
    utilizing a processor to aggregate the multiple data samples to form a combined sample fingerprint of the finger; and
    responsive to detecting the combined sample fingerprint matching a predetermined allowed fingerprint, providing a signal indicating the fingerprint is authentic;

wherein at least one of the multiple data samples is not aggregated based on a detected improper finger wipe.

17. The data processing system of claim 16 further comprising:
   providing a user interface (UI) to guide a movement of the finger on the touch screen; and
   providing feedback to the user as to progress of authentication.

18. The data processing system of claim 17 wherein guiding movement of the finger swipe is selected from the group of guiding movement at a desired velocity, at a constant velocity, in a desired direction, or with a desired pressure.

19. The data processing system of claim 17 wherein the detected improper finger swipe is detected from the group of at an improper velocity, at a variable velocity, in an improper direction, or with an improper pressure.

20. The data processing system of claim 17 further comprising responsive to detecting the combined sample fingerprint not matching a predetermined allowed fingerprint, providing a signal indicating the fingerprint is not authentic.

* * * * *